No Printed Specification Available
7412X
F. Krieg.
Pump Lift.
Patented Feb. 6, 1833.
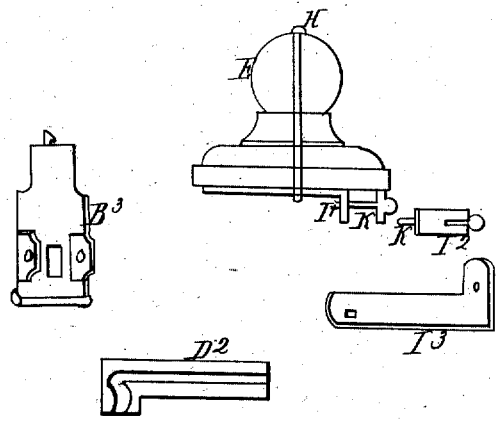
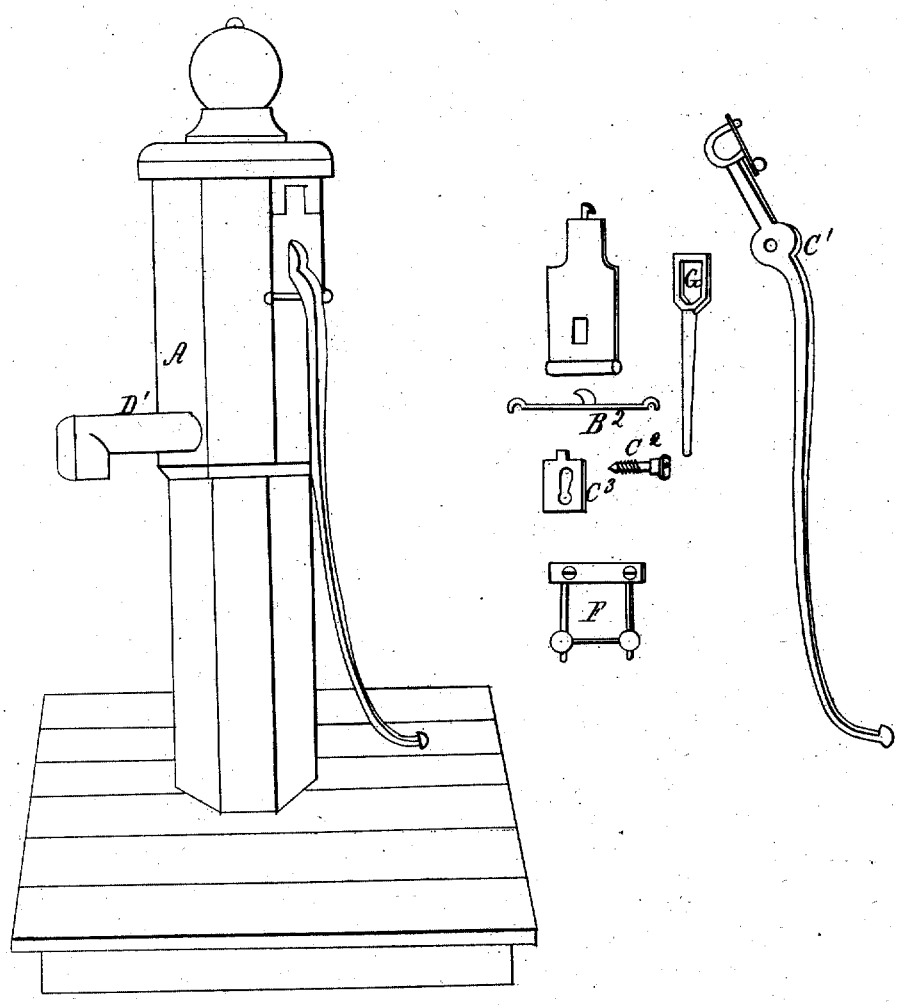
N. PETERS, PHOTO-LITHOGRAPHER, WASHINGTON, D. C.

Friedrick Kreig Baltimore Md.

Letters Patent

The Schedule referred to in these Letters Patent and making part of the same
containing a description in the words of the said Friedrick Kreig himself of
his improvements in pumps Be it known that I Friedrick Kreig of Baltimore in the County of Baltimore
and State of Maryland have made a new and useful improvement in Pumps
to prevent the introduction of hard substances through the top, handle [illegible]
and spout which would impede the operation of the pistons; the following
being a full and exact description of the construction and operation of the same
as invented or improved by me.
Article 1st B.No 1 (See the annexed drawings) represents the fulcrum plate
made of cast iron (or wood) in one solid piece and screwed fast with two
screw bolts having a round bar in front & a flat plate on the opposite sides
the fulcrum boy being made of cast iron or steel
B2 Represents a side view of the fulcrum plate with the boy in which the pin
of the handle works and the [illegible] which receives the cross bar & the hook
above to receive the plate which is fastened to the cap of the pump.
B3 Represents the inside of the fulcrum plate which may have its position
on the pump reversed in case the water should be shallow in order to increase
the leverage of the handle.
Article 2d. C. No 1. The handle or lever, — the part which receives the pin is
nearly round the hole to receive the pin being a half inch from its center & the
end of the lever of handle is bent in the form of a hook to receive the piston or
spear with a plate screwed on the top; the end of which plate [illegible] a small
hole in the end of the hook C2 the screw. C3 the plate
Article 3d D No 1. The spout made of wood or iron with this improvement that
the aperture through which the water escapes is made crooked instead of straight
as represented in the drawing D2 which prevents any injurious substances
getting into the pump thro' the spout.

[illegible]

[illegible] 7412X

Article 4th — B. Represents a [illegible] of the cap. Article 5th C. Two screw bolts
with a round bar & flat plate for securing the [illegible] plate and to prevent
the pump splitting the bar is made round that the handle may be removed
when necessary. Article 6. G. The upper end of the [illegible] piston
made solid and square at the top — In the common piston this part is usu-
ally made with a hook. Article 7th H. A screw bolt to fasten down the cap
Article 8 I. [illegible] A plate bent at one end downwards at right angles where
there is a screw K to draw the cap and [illegible] plate together with a square
hole at the other end to receive the upper end of [illegible] plate made in the
pump a hook. I. 2. The inner plate thro' which the screw passes I. 3. A
perspective view of plate I. No. 1. For a further illustration of my invention I
refer to the annexed drawings and the model deposited in the Patent Office.
What I claim as my invention and improvement for which I solicit
Letters Patent, is all that part of the pump described from Article 1st to Ar-
ticle 8th inclusive; except the part of the handle projecting from the pump &
the cap. In testimony whereof I hereunto subscribe my name this 25th
day of January 1833

Witnesses
Wm. P. Elliot
Wm. G. Cranch

Frederick [illegible]

[illegible]
[illegible]

(Dr in portfolio) [736 [illegible]